US011207975B2

(12) United States Patent
Wood et al.

(10) Patent No.: US 11,207,975 B2
(45) Date of Patent: Dec. 28, 2021

(54) PORTAL GEAR FOR MODEL VEHICLES (71) Applicant: Traxxas LP, McKinney, TX (US)

(72) Inventors: Jonathan Scott Wood, Frisco, TX (US); Otto Karl Allmendinger, Rowlett, TX (US)

(73) Assignee: TRAXXAS LP, McKinney, TX (US)

(*) Notice: Subject to any disclaimer, the term of this patent is extended or adjusted under 35 U.S.C. 154(b) by 146 days.

(21) Appl. No.: 16/481,360

(22) PCT Filed: Jan. 26, 2018

(86) PCT No.: PCT/US2018/015518
§ 371 (c)(1),
(2) Date: Jul. 26, 2019

(87) PCT Pub. No.: WO2018/140774
PCT Pub. Date: Aug. 2, 2018

(65) Prior Publication Data
US 2019/0389304 A1 Dec. 26, 2019

Related U.S. Application Data (60) Provisional application No. 62/451,640, filed on Jan. 27, 2017.

(51) Int. Cl.
F16H 35/00 (2006.01)
B60K 17/04 (2006.01)
(Continued)

(52) U.S. Cl.
CPC ............ B60K 17/043 (2013.01); B60K 17/06 (2013.01); B60K 17/303 (2013.01);
(Continued)

(58) Field of Classification Search
CPC .... B60K 17/043; B60K 17/303; B60B 35/001
See application file for complete search history.

(56) References Cited

U.S. PATENT DOCUMENTS 3,132,537 A * 5/1964 Maurice .................. F16H 3/663
475/278
3,225,627 A * 12/1965 Christenson ........ F16H 61/0262
475/145
(Continued)

FOREIGN PATENT DOCUMENTS

DE          10234607 A1     2/2004
DE       102004003644 A1    8/2005
(Continued)

OTHER PUBLICATIONS

European Search Report; European Patent Application No. EP 18744895; dated Jun. 8, 2020.
(Continued)

Primary Examiner — Jake Cook
(74) Attorney, Agent, or Firm — Daryl R. Wright; Greg Carr (57) ABSTRACT A portal gear and a method to implement a portal gear for a model vehicle are provided. The portal gear may include a drive shaft attached to an input gear and an axle attached to an output gear. The portal gear may further include a housing to vertically contain the input gear and the output gear. Wherein the drive shaft transfers a rotational torque from an upper location to a lower location via a gear reduction resulting from the input gear rotating the output gear.

20 Claims, 8 Drawing Sheets

SECTION A-A
SCALE 1 : 1

(51) Int. Cl.
*B60K 17/06* (2006.01)
*B60K 17/30* (2006.01)
*F16D 43/202* (2006.01)
*F16H 57/021* (2012.01)
*F16H 57/032* (2012.01)

(52) U.S. Cl.
CPC ........ *F16D 43/2028* (2013.01); *F16H 57/021* (2013.01); *F16H 57/032* (2013.01)

(56) References Cited

U.S. PATENT DOCUMENTS

| | | | |
|---|---|---|---|
| 4,344,501 A * | 8/1982 | Jerry | B60K 17/043 |
| | | | 180/253 |
| 2005/0079792 A1 | 4/2005 | Ogihara | |
| 2006/0025224 A1 | 2/2006 | Saeki et al. | |
| 2006/0207384 A1 | 9/2006 | Hardy et al. | |
| 2006/0278464 A1 * | 12/2006 | Byers | A63H 17/262 |
| | | | 180/333 |
| 2010/0007198 A1 * | 1/2010 | Armfield | B60B 35/003 |
| | | | 301/132 |
| 2010/0051403 A1 | 3/2010 | Lai | |
| 2012/0181850 A1 | 7/2012 | Armfield | |
| 2014/0230602 A1 * | 8/2014 | Shirley | B60K 17/354 |
| | | | 74/606 R |
| 2017/0097084 A1 * | 4/2017 | Eaton | B60K 17/043 |

FOREIGN PATENT DOCUMENTS

| | | |
|---|---|---|
| JP | 2001-124187 A | 5/2001 |
| KR | 20-0479211 Y1 | 1/2016 |
| WO | 2018140774 A1 | 8/2018 |

OTHER PUBLICATIONS

International Search Report, dated May 10, 2018, by the ISA/KR, re PCT International App No. PCT/US2018/015518.
Written Opinion, dated May 10, 2018, by the ISA/KR, re PCT International App No. PCT/US2018/015518.

* cited by examiner

SECTION A-A
SCALE 1 : 1

PORTAL GEAR FOR MODEL VEHICLES

RELATED APPLICATIONS

This application claims the benefit of a related U.S. Provisional Application Ser. No. 62/451,640, filed Jan. 27, 2017, entitled "PORTAL GEAR FOR MODEL VEHICLES," to Jonathan Scott Wood, et. al., the disclosure of which is incorporated by reference herein in its entirety for all purposes.

BACKGROUND

The following descriptions and examples are not admitted to be prior art by virtue of their inclusion in this section.

Portal gears are a method of configuring the drive system in a model vehicle such that the axle tube is above the center of the wheel hub and where there is a reduction gearbox in the hub. Portal gears improve performance of model vehicles by (1) increasing the ground clearance below the vehicle axles and (2) providing additional gear reductions for the overall axle assembly of the vehicle. The addition of gear reduction via the portal gear reduces the torque applied through the center drive shafts. By reducing this torque, the axle is less prone to twisting and preloading the suspension. Twisting of the axle due to low numerical axle ratio can have significant effect on driving performance.

Unfortunately, the implementation of portal gears is usually associated with concerns for additional costs. The conventional portal gear tends to have four (4) gears—input, output, and two idlers. Accordingly, there is a need for a portal gear with a simplified design that provides the same performance increase while keeping cost low.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure provides a portal gear for model vehicles with a simplified two-gear design. The portal gear may include a drive shaft coupled to an input gear and an axle coupled to an output gear. In addition, the portal gear may include a housing configured to vertically contain the input gear and the output gear. Wherein the drive shaft transfers a rotational torque from an upper location to a lower location via a gear reduction resulting from the input gear rotating the output gear.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

In the following discussion, numerous specific details are set forth to provide a thorough understanding of the present disclosure. However, those skilled in the art will appreciate that embodiments of the present disclosure may be practiced without such specific details. Additionally, for the most part, specific details, and the like have been omitted inasmuch as such details are not considered necessary to obtain a complete understanding of the present disclosure.

Figure 1:
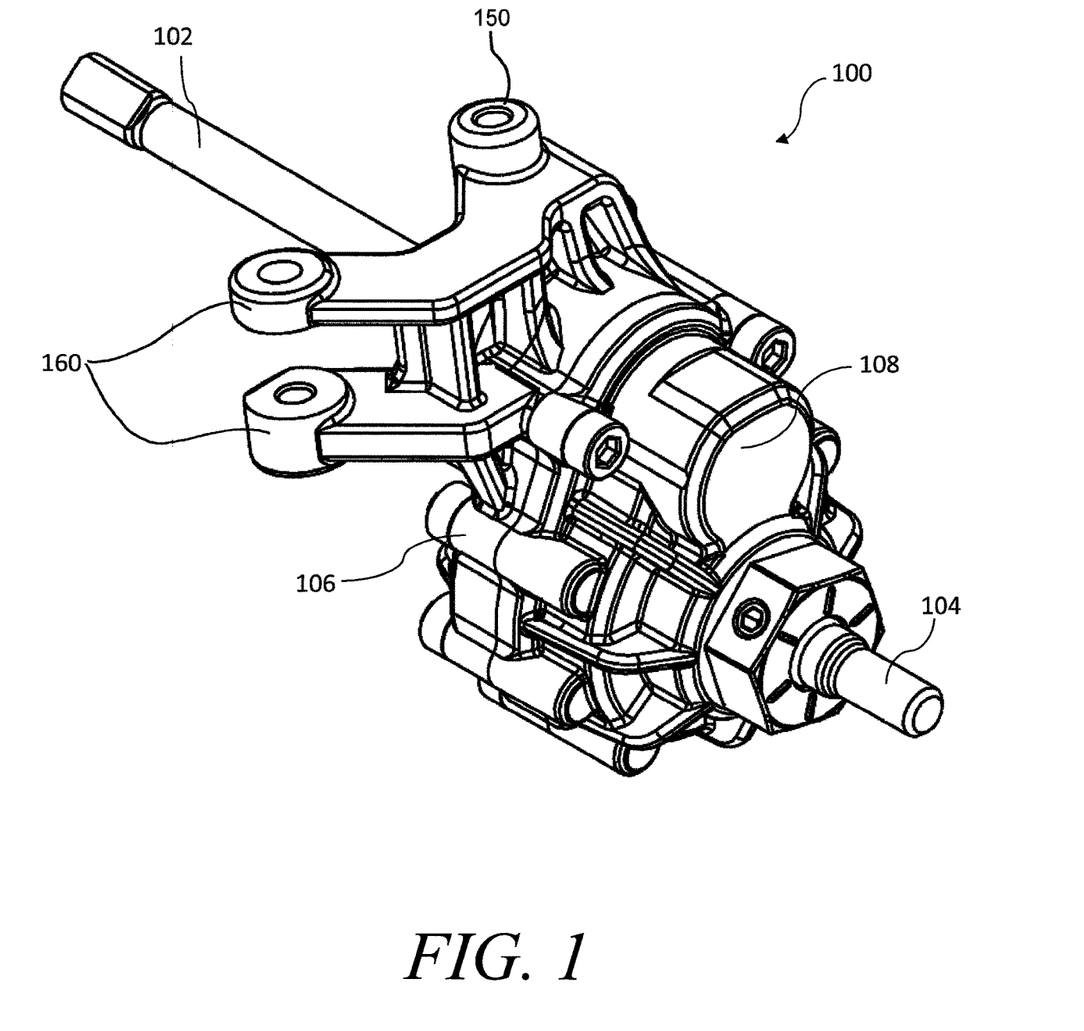
FIG. 1 illustrates a perspective view of a portal gear connected to a drive shaft.
Figure 2:
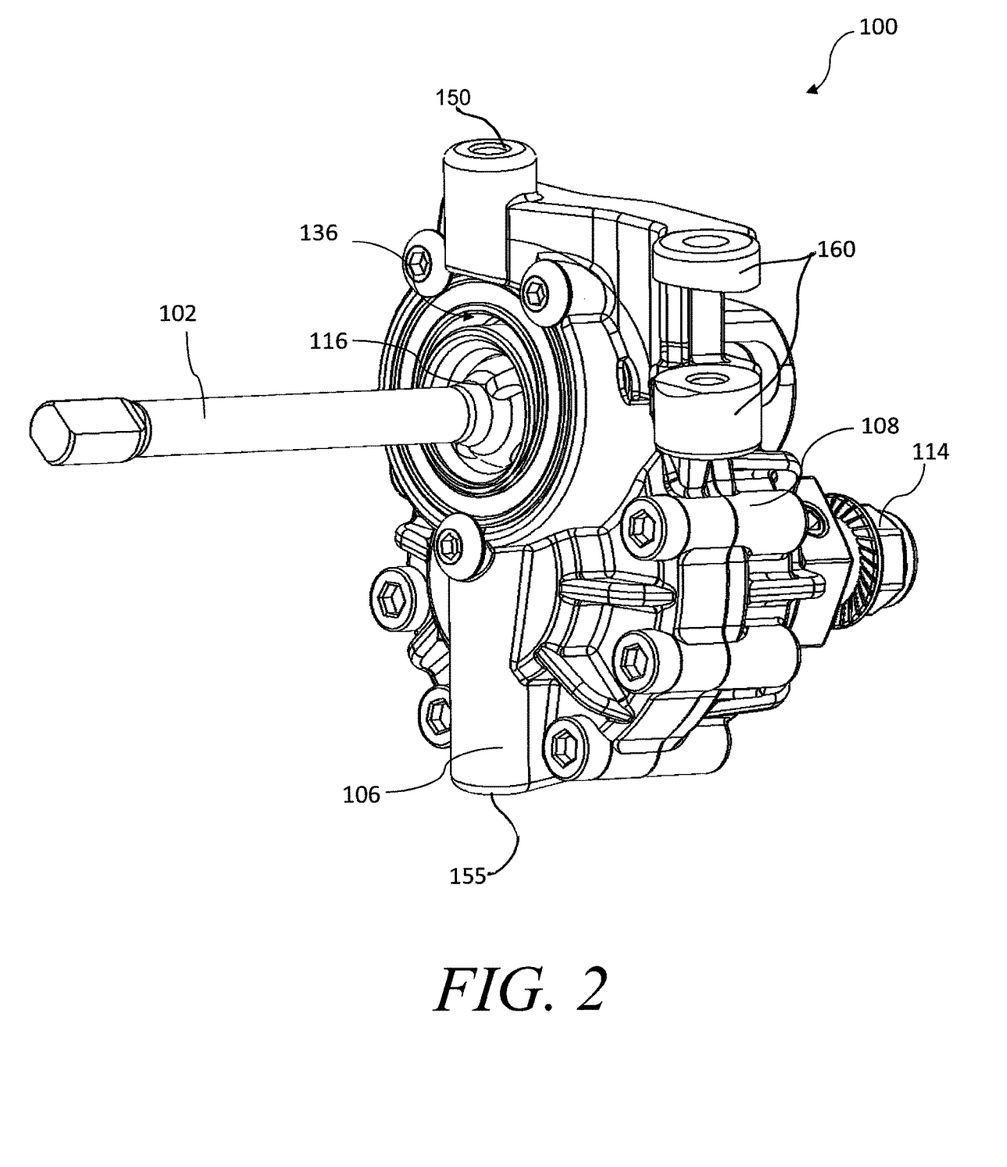
FIG. 2 illustrates another perspective view of the portal gear connected to the drive shaft.

FIGS. 1 and 2 generally illustrate a solid axle and a portal gear 100 for configuring the drive system of a model vehicle. The portal gear 100 may transfer torque between a drive shaft 102 and a portal axle 104. The portal gear 100 may improve the performance of the model vehicle by positioning the axle housing and differential centers above the wheel center, thereby increasing the ground clearance below the axles. In some embodiments, the portal axle 104 may transfer torque via the portal hex 114 to a model vehicle wheel (not shown).

The portal gear 100 may comprise an additional gear reduction within an inner portal housing 106 and an outer portal housing 108 to increase the gear reduction of the overall axle assembly. The increased load reduction may allow for smaller gears and shafts in the drivetrain upstream of the portal gear reduction. In an embodiment, the ring and pinion for the differential and the center drive shafts may therefore be smaller due to the reduction in torque.

In an embodiment, the reduction of the portal gear 100 may be simplified to a two-gear design by removing two idler gears typically found in portal gears for full size vehicles. The two-gear design of the portal gear 100 may decrease the overall cost of the portal gear 100 due to the removal of the additional idler gears and bearings and the resulting overall simplification. The removal of the idler gears may also decrease the size of the overall assembly of the portal gear 100 and save space within the model vehicle.

The smaller space required by the reduction of the portal gear 100 may create the opportunity to increase and maximize the numerical gear ratio of the reduction as allowed by the space saved from the removal of the idler gear. The increase in the numerical gear ratio directly impacts and lessens the "torque twist" of the suspension system.

Figure 4A:
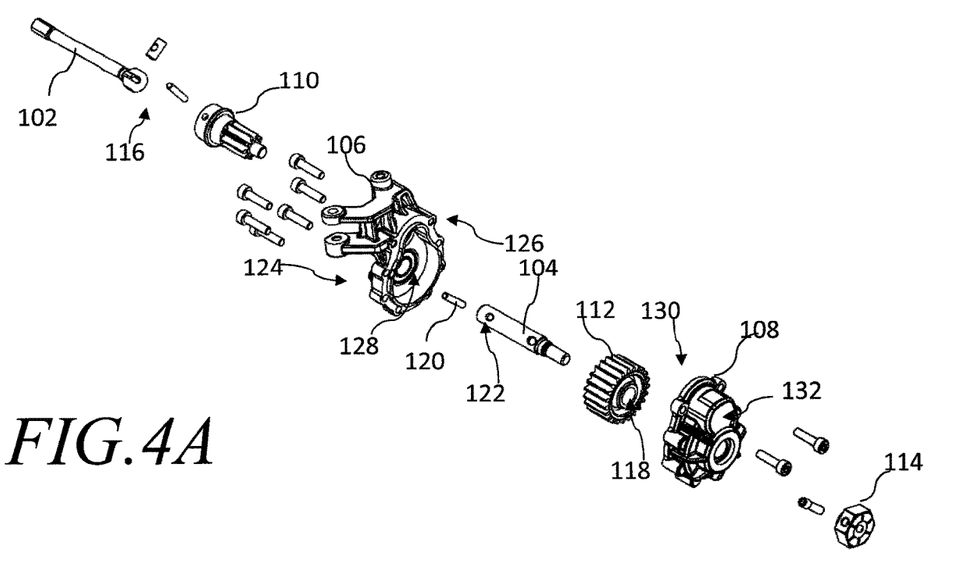
FIGS. 4A-4D illustrate exploded views of the portal gear being assembled.

Space is also saved in the portal gear 100 by consolidating the drive shaft 102 and a portal input gear 110 (See FIG. 4A for Example) into a single assembly. Typically, the drive shaft 102 and the portal input gear 110 require separate additional parts and space to assemble. In the embodiment of the portal gear 100 shown, the drive shaft 102 may be integrated with the portal input gear 110 via a universal joint (u-joint) 116. The u-joint 116 allows the drive shaft 102 to traverse in any direction and transmit rotary motion into the portal input gear 110. The resulting smaller sized portal gear 100 may allow the overall portal gear 100 to be configured to falling substantially within the space of a typical model vehicle wheel.

In some embodiments, the portal gear 100 may be located on a front axle of the model vehicle, requiring upper and lower pivot points 150, 155 and steering arm connection 160. These features may be located on portal inner housing 106 or the outer portal housing 108, depending upon application.

Figure 3:
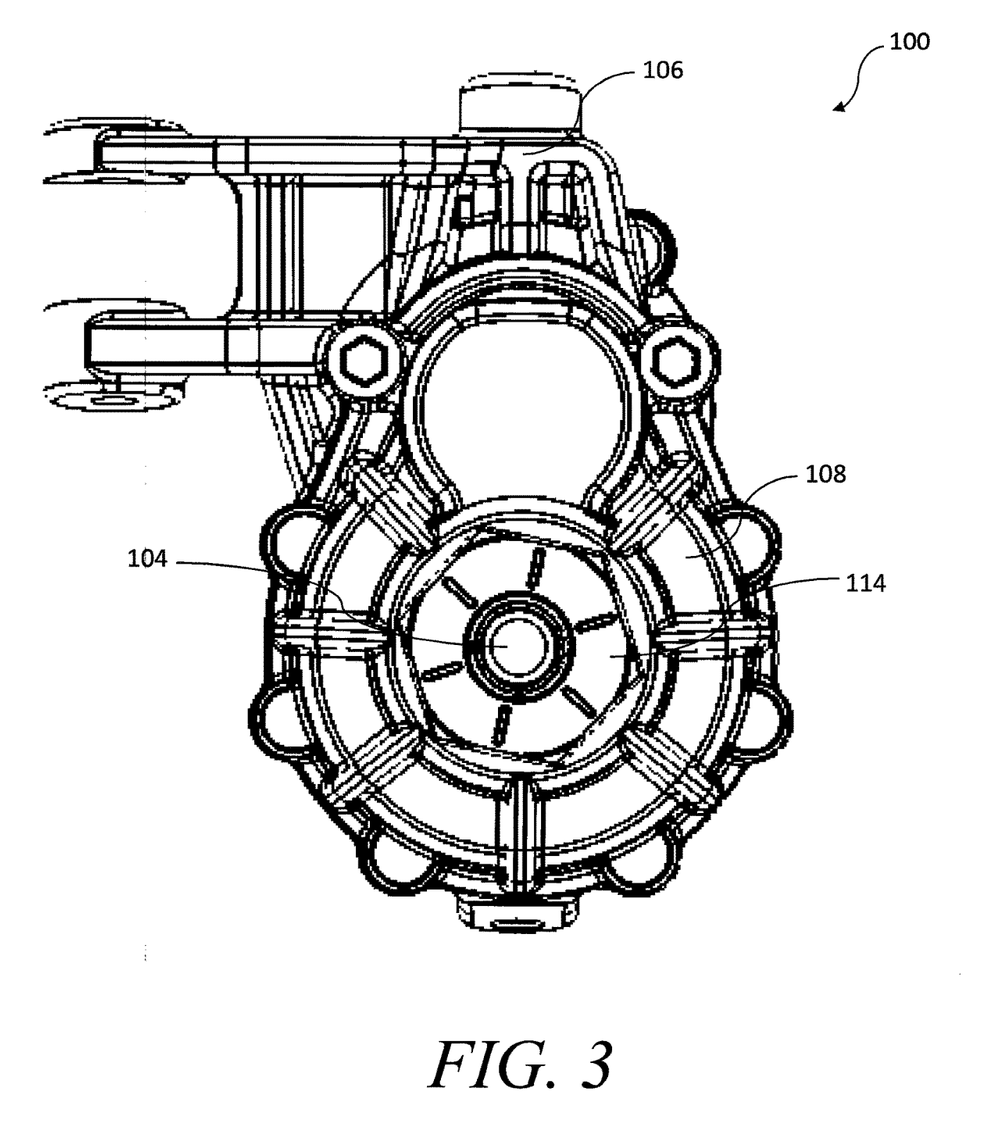
FIG. 3 illustrates a front view of the portal gear.

FIG. 3 shows a frontal view of the portal gear 100 with the portal axle 104 extending out of the outer portal housing 108. The portal axle 104 may transfer power to a connected wheel of the model vehicle (not shown). In addition, FIG. 3 shows a frontal view of a portal hex 114, used for transferring the torque of the portal axle 104 to a typical model vehicle wheel as stated previously.

Figure 4B:
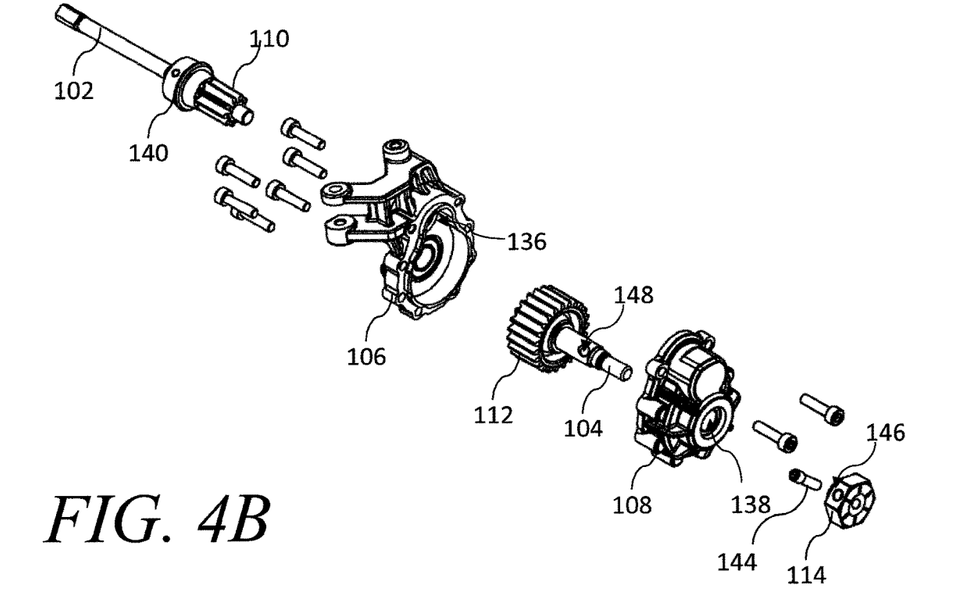

Turning to FIGS. 4A-4D and 5, the portal gear 100 may be assembled by enclosing the portal input gear 110 and the portal output gear 112 between the inner portal housing 106 and the outer portal housing 108. In FIG. 4B, the drive shaft 102 may be integrated with the portal input gear 110 by joining the ends of the drive shaft 102 and the portal input gear 110 with the universal joint 116.

The portal output gear 112 may be coupled to the portal axle 104 by inserting the portal axle 104 through a center opening 118 in the portal output gear 112. The rotational and axial position of the portal axle 104 may be fixed in position relative to the portal output gear 112 by locking mechanism, in this case, through the use of a pin 120 inserted through a diametrically extending hole 122 through the portal axle 104.

Opposing ends of the pin 120 may extend from the hole 122 into corresponding notches in the portal output gear 112 to prevent relative movement of the portal axle 104 axially away from the portal output gear 112 after the portal axle is inserted into the portal output gear 112. The pin 120 may also ensure that rotation of the portal output gear 112 in turn rotates the portal axle 104.

The position, size, and shape of the corresponding notches in the portal output gear 112 may be formed such that the opposing ends extending from the portal axle 104 may be fitted within the corresponding notches in the portal output gear 112 when the portal axle 104 is inserted through the center opening 118 of the portal output gear 112.

The inner portal housing 106 may comprise a vehicle side 124, a contacting side 126, and a recessed gear cavity 128. The recessed gear cavity 128 may open towards the contacting side 126 of the inner portal housing 106. The recessed gear cavity 128 may be formed in the shape of a pair of adjacent abutting circular recesses to partially enclose the portal input gear 110 and the portal output gear 112 when the teeth of the two gears are mated.

The recessed gear cavity 128 may be sized to fit both the portal input gear 110 and the portal output gear 112 within the cavity 128. The outer portal housing 108 may similarly comprise a contacting side 130, a wheel side 132, and a recessed gear cavity 134 substantially matching the shape and size of the recessed gear cavity 128 in the inner portal housing 106.

The recessed gear cavity 134 of the outer portal housing 108 may partially enclose some portions of the portal input gear 110 and the portal output gear 112 not enclosed by the recessed gear cavity 128 of the inner portal housing 106. The contacting sides 126, 130 of the inner portal housing 106 and the outer portal housing 108 may be fitted together such that the recessed gear cavities 128, 130 of completely enclose the portal input gear 110 and the portal output gear 112.

As shown in FIG. 4B, the inner portal housing 106 may further comprise a through opening 136 in the recessed gear cavity 128 such that the portal input gear 110 may be inserted into the recessed gear cavity 128 from the vehicle side 124 of the inner portal housing 106. The outer portal housing 108 may similarly comprise a through opening 138 in its recessed gear cavity 134 such that the portal axle 104 affixed to the portal output gear 112 may extend through the outer portal housing 108 from the contacting side 130 of the outer housing 108 to the wheel side 132.

The portal gear 100 may be assembled by threading the portal input gear 110 through the opening 136 in the inner portal housing 106 and positioning the portal input gear 110 within the recessed gear cavity 128 of the inner portal housing 106. The portal input gear 110 may comprise a flange 140 extending out of the outer perimeter surface of the portal input gear 110.

The flange 140 may extend from a portion of the portal input gear 110 between the end of the portal input gear 110 connected to the drive shaft 102 and the teeth of the portal input gear 110. The through opening 136 in the recessed gear cavity of the inner portal housing 106 may be sized such that only the teeth portion of the portal input gear 110 may fit through the opening 136. The portal input gear 110 may be inserted through the inner portal housing 106 until the flange 140 contacts the vehicle side 124 of the inner portal housing 106.

The portal output gear 112 may then be directly positioned adjacent the portal input gear 110 within the recessed gear cavity 128 such that the teeth of the portal input gear 110 and the portal output gear 112 are mated together. The portal output gear 112 may be positioned within the inner portal housing 106 with the portal axle 104 extending away from the contacting side 126 of the inner portal housing 106. The recessed gear cavity 128 of the inner portal housing 106 may be sized such that is clearance for the portal input gear 110 and portal output gear 112 to rotate.

When both the portal input gear 110 and the portal output gear 112 are positioned within the recessed gear cavity 128 of the inner portal housing 106, the contacting side 130 of the outer portal housing 108 may be subsequently secured against the contacting side 126 of the inner portal housing 106 to enclose the gears 110, 112.

The portal axle 104 extending from the portal output gear 112 may be threaded through the opening 138 in the recessed gear cavity 134 of the outer portal housing 108 when the outer portal housing 108 and the inner portal housing 106 are contacted together. The outer portal housing 108 may then be removably affixed to the inner portal housing 106 by six mechanical fasteners inserted from the vehicle side 124 inner portal housing 106 and two mechanical fasteners inserted from the wheel side 132 of the outer portal housing 108. The mechanical fasteners securing the inner portal housing 106 and outer portal housing 108 together may include but is not limited to screws, nails, bolts, pins, clips, lugs and the like.

Figures 4C, 4D:
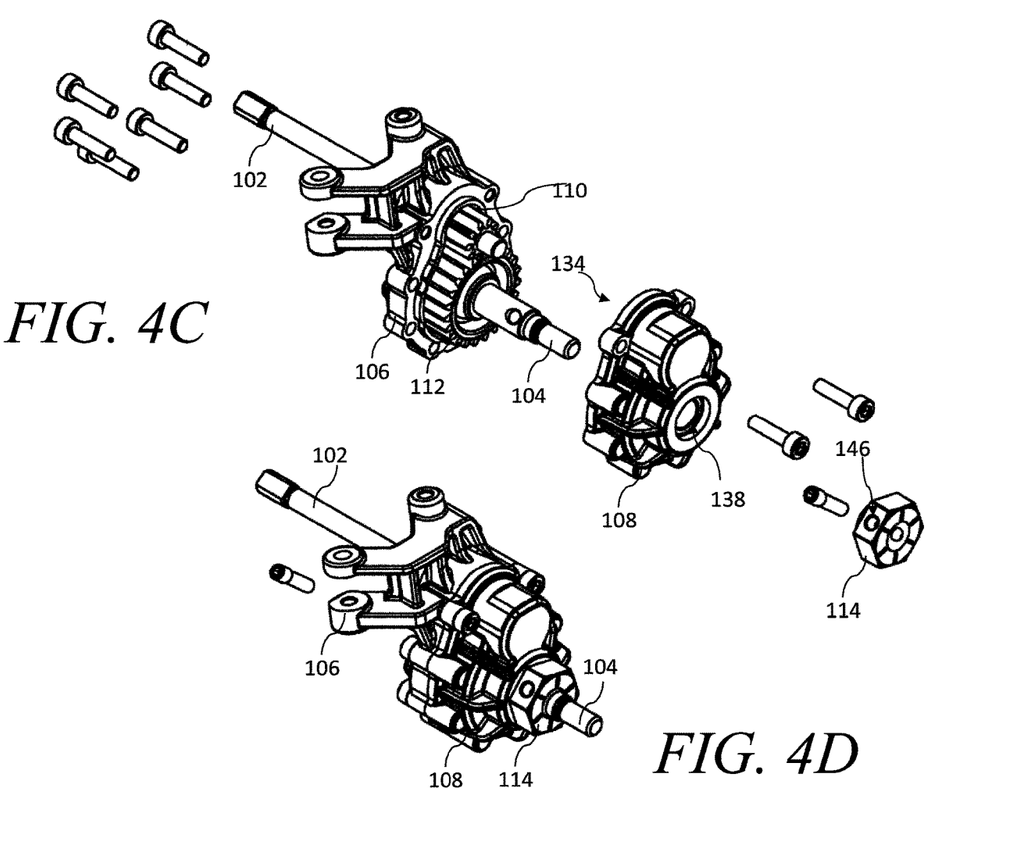
Figure 5:
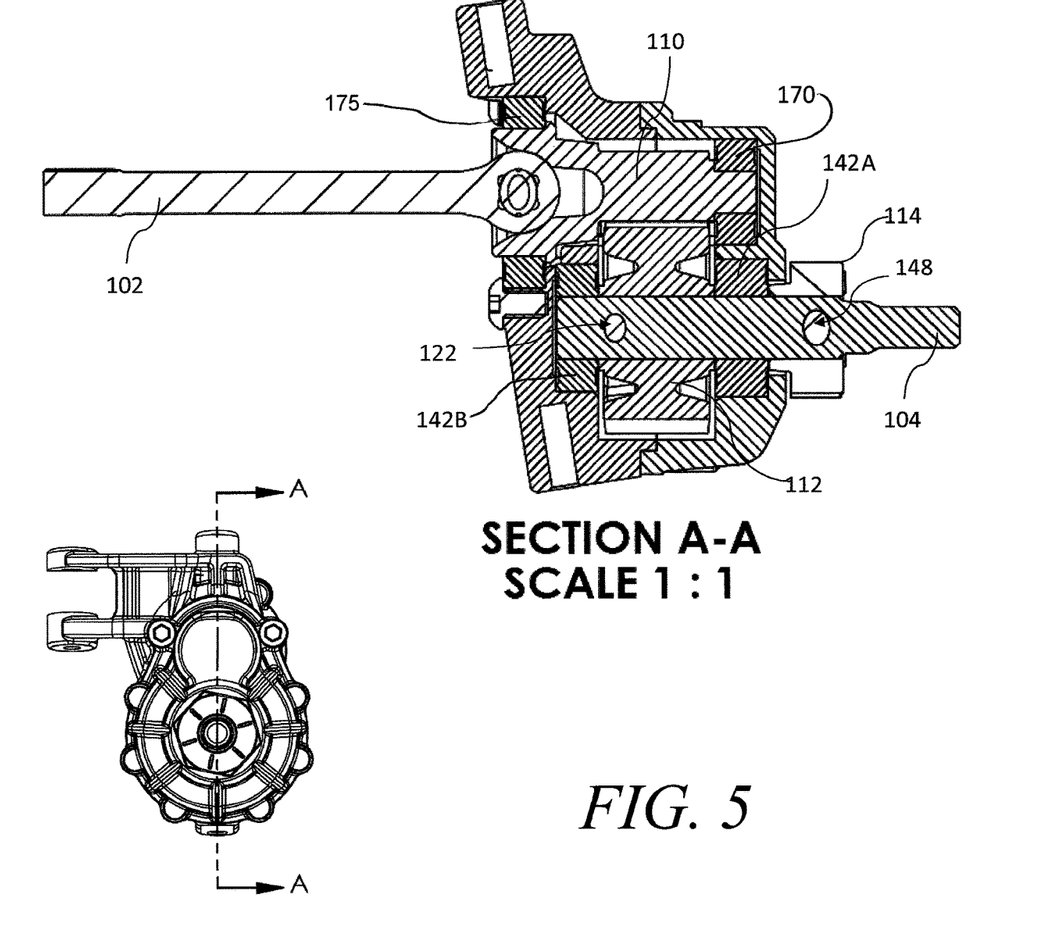
FIG. 5 illustrates a cross-sectional view of a portion of the portal gear and the drive shaft.

As shown in FIGS. 4D and 5, after the outer portal housing 108 and the inner portal housing 106 are engaged, a portal hex 114 may positioned over a portion of the portal axle 104 extending out of the wheel side 132 of the outer portal housing 108. The portal hex 114 may be positioned along the axle 104 until the portal hex 114 contacts a bearing 142A also positioned along the portal axle 104 between the portal output gear 112 and the outer portal housing 108.

When secured against bearing 142A, the portal hex 114 prevent the portal axle 104 from moving axially moving towards the center of the model vehicle (i.e., to the left in FIG. 5) or hitting the contacting side of the inner portal housing 106. The portal hex 114 may be secured along the portal axle 104 by a pin 144 inserted through a first diametrically extending hole 146 through the portal hex 114 and a second diametrically extending hole 148 through the portal axle 104. The pin 144 secures the contact between the portal hex 114 and the bearing 142A.

When the portal hex 114 is assembled at the end of the portal axle 104, the portal hex 114 may also support the wheel and transmit torque to a model vehicle wheel (not shown). The portal hex 114 may be any other form of mechanical fasteners including but not limited to nuts, washer, locks, caps, and the like.

As also shown in FIG. 5, inner bearing 142B is located in the recessed gear cavity 128 and supports another end of portal axle 104. Correspondingly, bearing 170 located in the recessed gear cavity 134 and bearing 175 located against the inner portal housing support the portal input gear 110.

Figure 6:
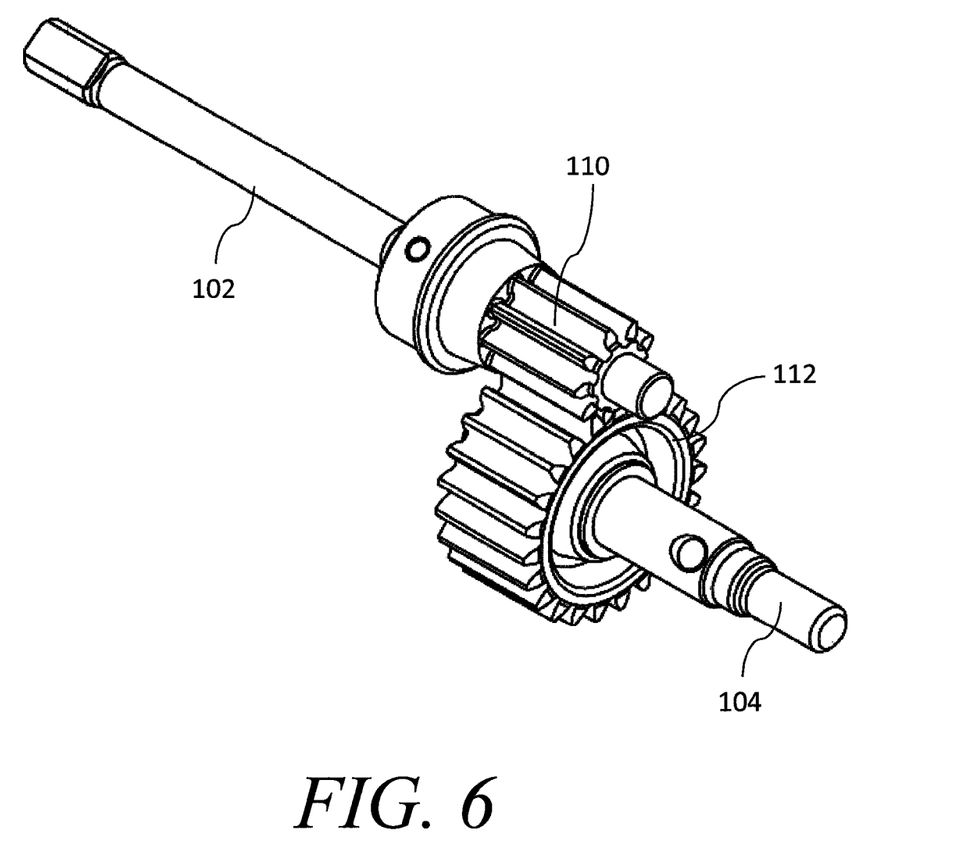
FIG. 6 illustrates the reduction between a portal input gear and a portal output gear.
Figure 7:
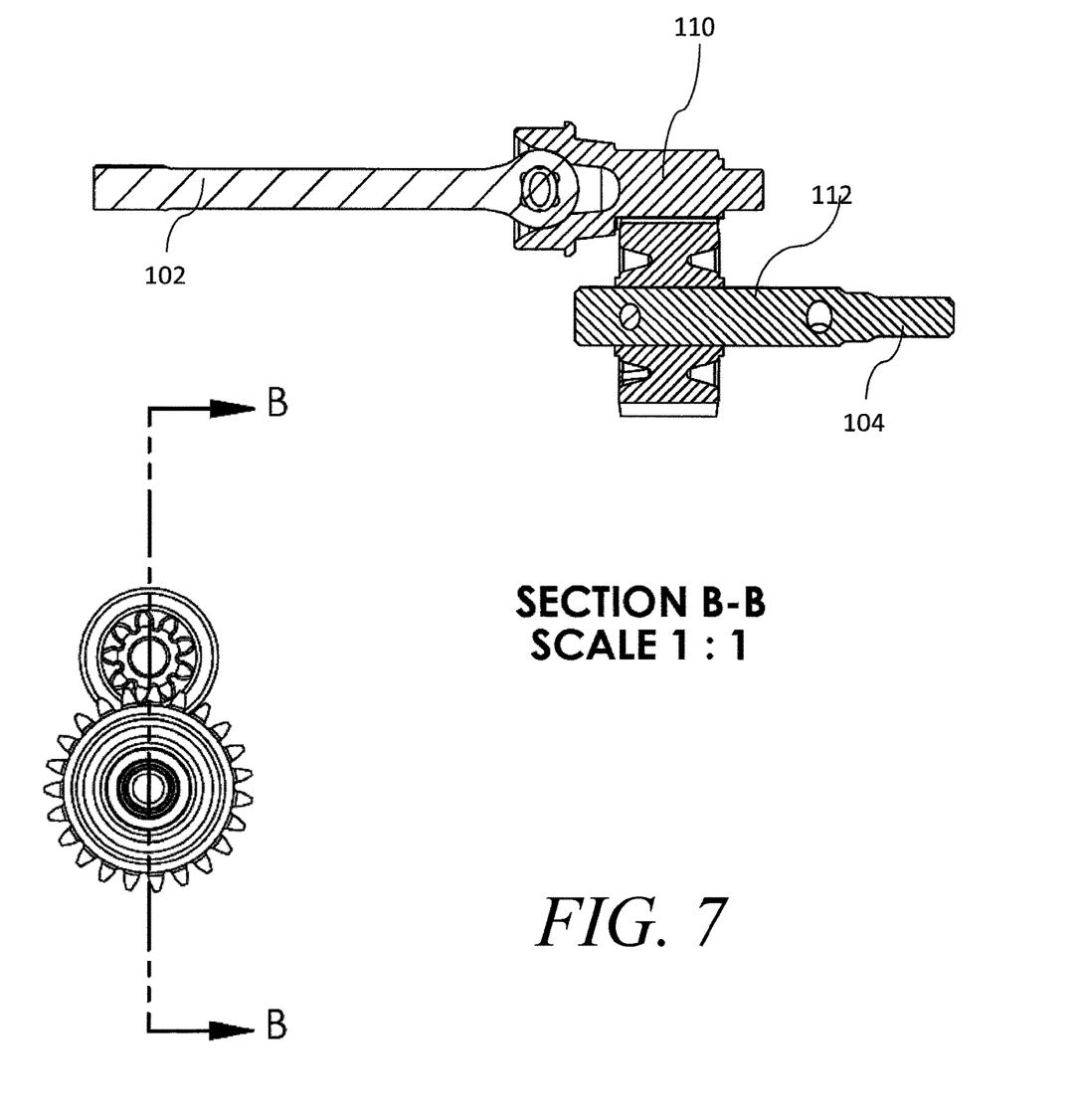
FIG. 7 illustrates a cross-sectional view of a portion of the reduction between the portal input gear and the portal output gear.

FIGS. 6 and 7 show the reduction between the portal input gear 110 and the portal output gear 112 within the inner portal housing 106 and the outer portal housing 108. The additional reduction at the portal gear 100 increases the total numerical ratio of the axle assembly and reduces the torque applied through the drives shafts.

In the embodiment show, the portal gear ratio is 2.56:1 (23/9) and the ring and pinon of the axle is 3.09:1 (34/11). This makes the gear ratio of the axle assembly 7.9:1. In other embodiments, the portal gear ratio is in the range between 2.25:1 to 2.75:1. While in still other cases, the portal gear ratio is in the range between 2:1 to 3:1. As shown in FIG. 6, the teeth of the portal input gear 110 and the portal output gear 112 are mated to transfer torque between the drive shaft 102 and the portal axle 104. Alternatively, gears of various sizes and ratio may be used for the portal depending on the overall size of the portal gear 100 and the availability of space within the inner portal and outer housing.

Elements of the embodiments have been introduced with either the articles "a" or "an." The articles are intended to mean that there are one or more of the elements. The terms "including" and "having" are intended to be inclusive such that there may be additional elements other than the elements listed. The term "or" when used with a list of at least two elements is intended to mean any element or combination of elements.

Although only a few example embodiments have been described in detail above, those skilled in the art will readily appreciate that many modifications are possible in the example embodiments without materially departing from this disclosure. The embodiments disclosed are illustrative rather than limiting in nature and that a wide range of variations, modifications, changes, and substitutions are contemplated in the foregoing disclosure and, in some instances, some features of the present disclosure may be employed without a corresponding use of the other features. Many such variations and modifications may be considered desirable by those skilled in the art based upon a review of the foregoing description of exemplary embodiments. Accordingly, it is appropriate that any claims supported by this description be construed broadly.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A portal gear for a model vehicle comprising:
    a drive shaft rotatively coupled to an input gear via a universal joint;
    a first and second input bearing rotatively supporting the input gear;
    an axle coupled to an output gear;
    a housing configured to vertically contain the input gear and the output gear;
    wherein the drive shaft transfers a rotational torque from an upper location to a lower location via the input gear rotating the output gear; and
    wherein the universal joint is within one of the first or the second input bearings.

2. The portal gear according to claim 1, further comprising:
    a portal hex coupled to the output gear;
    wherein the portal hex is configured to transfer the rotational torque to a model vehicle wheel.

3. The portal gear according to claim 1, wherein the housing comprises an inner portal housing and an outer portal housing.

4. The portal gear according to claim 1, wherein the portal gear comprises a steering arm connection.

5. The portal gear according to claim 1, wherein the portal gear ratio is 2.56:1.

6. The portal gear according to claim 1, wherein the portal gear ratio is in a range of 2.25:1 to 2.75:1.

7. The portal gear according to claim 1, wherein the portal gear ratio is in a range of 2:1 to 3:1.

8. A portal gear for a model vehicle comprising:
    a drive shaft rotatively coupled to an input gear via a universal joint;
    a first and second input bearing rotatively supporting the input gear;
    an axle coupled to an output gear via a pin connection;
    a first and second output bearing rotatively supporting the axle;
    a housing configured to vertically contain the input gear and the output gear;
    wherein the drive shaft transfers a rotational torque from an upper location to a lower location via the input gear driving the output gear; and
    wherein the universal joint is within one of the first or the second input bearings.

9. The portal gear according to claim 8, further comprising:
    a portal hex coupled to the output gear;
    wherein the portal hex is configured to transfer the rotational torque to a model vehicle wheel.

10. The portal gear according to claim 8, wherein the portal gear ratio is 2.56:1.

11. The portal gear according to claim 8, wherein the portal gear ratio is in a range of 2.25:1 to 2.75:1.

12. The portal gear according to claim 8, wherein the portal gear ratio is in a range of 2:1 to 3:1.

13. The portal gear according to claim 8, wherein the portal axle is configured to be rotatively fixed to a model vehicle wheel.

14. A method for transferring torque via a model vehicle portal gear, comprising:
    coupling a driveshaft to an input gear via a universal joint;
    supporting the input gear with a first and a second input bearing;

coupling the model vehicle portal axle to an output gear;
engaging the input gear and the output gear;
driving the input gear with the drive shaft to provide torque to the model vehicle portal axle;
wherein the input gear is located substantially vertical relative to the output gear; and
wherein the universal joint is within one of the first or the second input bearings.

15. The method according to claim 14, wherein a gear range between the input gear and the output gear is from 2.25:1 to 2.75:1.

16. The method according to claim 14, wherein a gear range between the input gear and the output gear is from 2:1 to 3:1.

17. The method according to claim 14, wherein the model vehicle portal axle is rotatively fixed to a portal hex.

18. The portal gear according to claim 1, further comprising:
a first and a second output gear bearing rotatively supporting the axle.

19. The portal gear according to claim 1, wherein the input gear has a smaller radius than the output gear.

20. The portal gear according to claim 8, wherein the input gear has a smaller radius than the output gear.

* * * * *

(12) SUPPLEMENTAL EXAMINATION CERTIFICATE

United States Patent  
Wood et al.

(10) Number: US 11,207,975 F1  
(45) Certificate Issued: Jun. 26, 2024

Control No.: 96/050,040  
Filing Date: May 22, 2024  
Primary Examiner: William E Dondero No substantial new question of patentability is raised in the request for supplemental examination. See the Reasons for Substantial New Question of Patentability Determination in the file of this proceeding.

(56) Items of Information

OTHER DOCUMENTS

TRAXXAS, L.P.; "Steel Constant-Velocity (CV) Driveshafts Installation"; Installation Manual; April 5, 2016; 2 pages.